3,666,497
PREPARATION OF HIGH VISCOSITY STERILIZED
PROTEIN SOLUTIONS
Aubrey P. Stewart, Jr., Clarence R. Dreier, and John D. Falk, Corning, Iowa, assignors to Allied Chemical Corporation, New York, N.Y.
Filed Sept. 9, 1969, Ser. No. 856,411
Int. Cl. A23c 3/02
U.S. Cl. 99—212
6 Claims

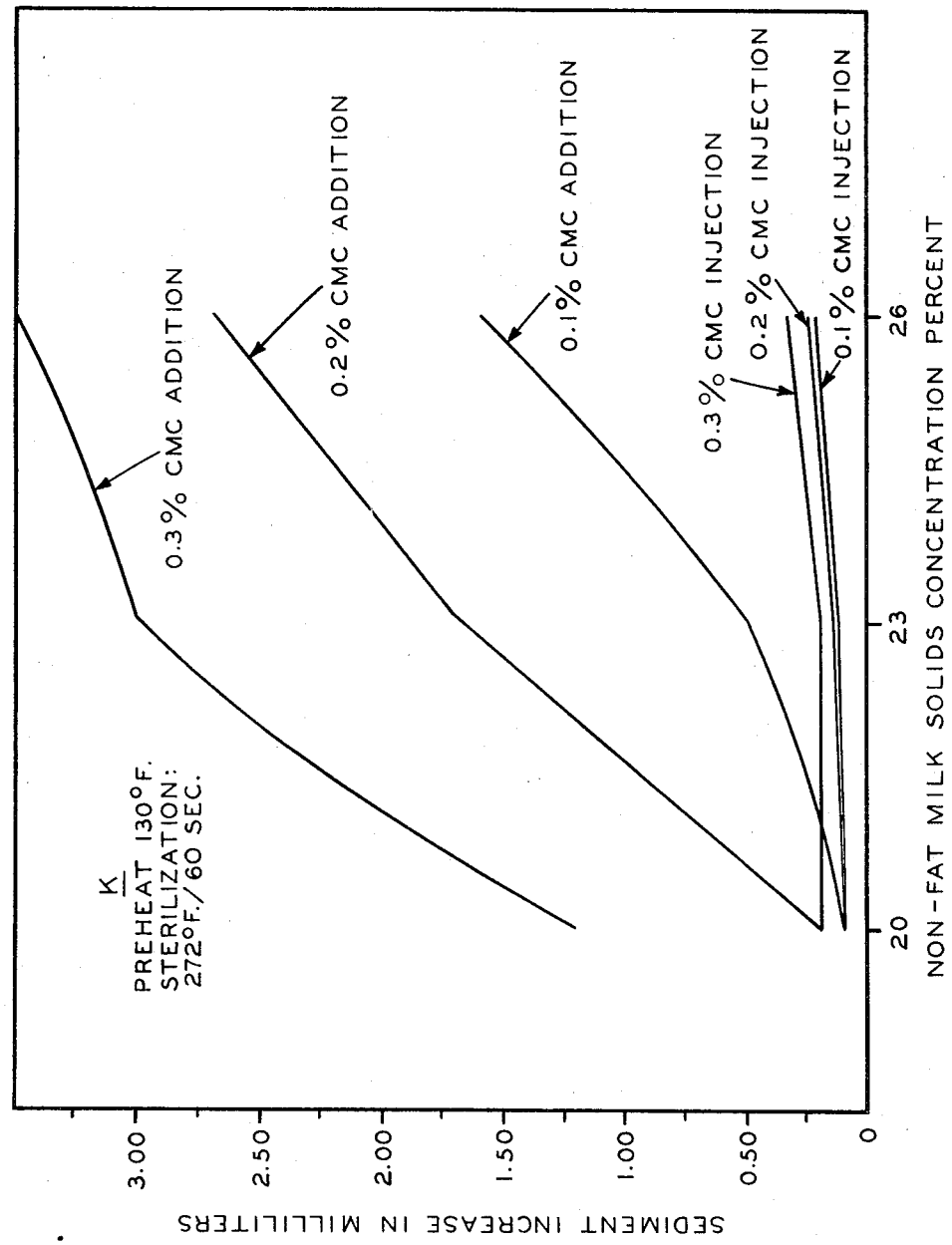

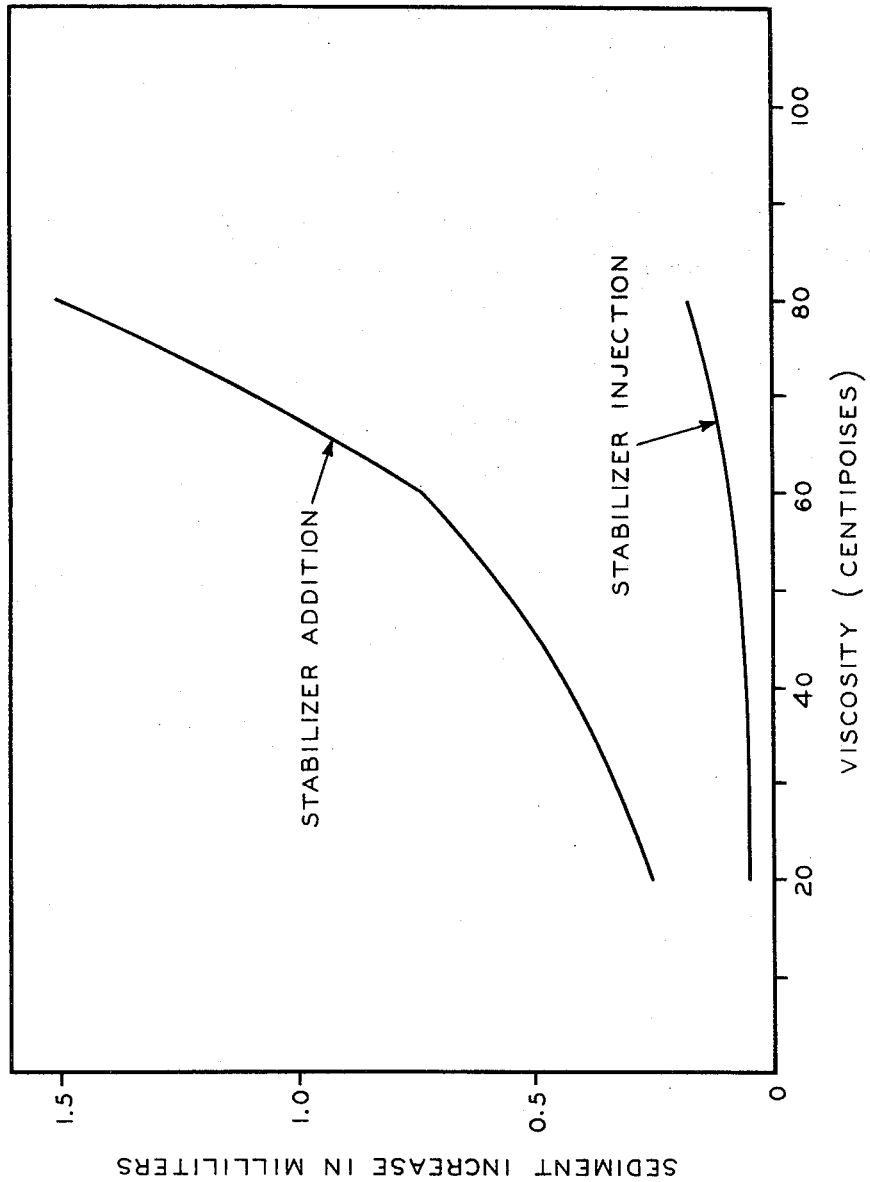

ABSTRACT OF THE DISCLOSURE

Viscous dairy products having non-fat milk solid concentrations as high as 31% by weight are prepared without the occurrence of protein coagulation causing sedimentation by adding a thickening agent to the dairy product in the later stages of sterilization and preferably adding the thickening agent after the product is sterilized.

BACKGROUND OF THE INVENTION

This invention relates to a method for preparing sterile liquid food products derived from aqueous bases containing relatively high non-fat milk solid concentrations and thickening agents. More particularly, this invention relates to a method for preparing such aqueous based sterile food products under conditions which do not generate undesirable protein coagulation.

In recent years, the techniques of high-temperature, short-time sterilization have been applied to the production of sterile aqueous based food products, such as concentrated milk. It is generally well known that sterile food products prepared by utilizing high-temperature, short-time techniques have a flavor superior to products sterilized by more conventional "in the can" methods. One generally accepted method for producing sterile concentrated milk products that utilizes high-temperature, short-time sterilization is described in U.S. Pat. 3,230,095, "Methods of Sterilization," issued Jan. 18, 1966 to A. P. Stewart, Jr., and U.S. Pat. 3,340,072, "Process for Producing Aseptically Canned Milk," issued Sept. 5, 1967 to A. P. Stewart, Jr. Although the above patents describe particularly effective methods for sterilizing concentrated milk products, neither the patented processes nor other high-temperature, short-time sterilization methods have heretofore been applied in preparing dairy products containing high non-fat milk solid concentrations and containing, as well, high concentrations of stabilizers of the type which serve as thickening agents. This is because thickening agents, in general react with or cause protein-containing milk products to destabilize, producing coagulation, during heat treatment rendering the final product commercially unacceptable.

Typical food products utilizing such stabilizers in conjunction with high non-fat milk solid concentrations as above described are concentrated ice cream mix, pie fillings, puddings and the like. Examples of well-known stabilizers include guar gum, carrageenin, sodium alginate, sodium carboxymethylcellulose, gum acacia, starches, starch derivatives, and pectins. These stabilizers have not only a thickening effect on food products, but also serve other functions such as maintaining emulsions of immiscible liquids; e.g., oil-in-water or water-in-oil; providing a product with a smoother texture; controlling ice crystal formation during freezing; and controlling incorporation of air during freezing.

When viscous dairy product formulations containing thickening agents and having non-fat milk solid concentrations in excess of 20% by weight in the water phase are subjected to high-temperature, short-time sterilization protein coagulation is induced; whereas dairy product formulations without thickening agents added may be high-temperature, short-time sterilized without the occurrence of protein coagulation although the non-fat milk solid concentration is as high as 27% by weight in the water phase and as high as 31% in the case of concentrates with optimum salt balance. The term "viscous dairy product" as used above is taken to mean a dairy product wherein the viscosity is increased between 1.5–4 times the viscosity of the product without stabilizer. If stabilizer, or thickening agent, is added to increase the viscosity in excess of four times that of the product without stabilizer, coagulation of protein may occur upon sterilization at non-fat milk solids concentrations as low as 6–8% in the water phase. As used herein in the specification and claims, the percentage of non-fat milk solids by weight in the water phase refers to the weight of non-fat milk solids dispersed in water based on the combined weight of non-fat milk solids and water. When further reference is made to percentage of non-fat milk solids in the specification and claims, such percentages should be understood to be determined in the water phase, as defined above, unless otherwise indicated.

As used herein, the term "dairy product" shall be taken to mean a product the formulation of which includes the usual dairy milk either in original form or increased in solids content, or synthetic substitutes such as milks of vegetable fat and milk proteins, and milks of animal fat and vegetable proteins, which are often combined to produce a milk-like product.

SUMMARY OF THE INVENTION

According to the instant invention, viscous dairy products having non-fat milk solid concentrations as high as 27% by weight are prepared without the occurrence of excessive protein coagulation causing sedimentation by adding the stabilizer to the dairy product in the later stages of sterilization even as high as 31% in salt balance adjusted concentrates. Although the stabilizer may be added in the later stages of sterilization, it is preferable to add the stabilizer after the concentrated product is high-temperature, short-time sterilized. When the stabilizer system is added to the sterilized product, it is separately presterilized prior to admixture, if a sterile final product is desired; whereas if the stabilizer system is added during the later stages of sterilization, a sterile final product is obtained without the separate presterilization step.

Suitable stabilizer systems useful in the preparation of the viscous dairy products herein are disclosed in United States application with Ser. No. 841,966, entitled "Flowable Stabilizer Suspensions." The stabilizer suspensions therein described comprise a pelletizer stabilizer coated with a water soluble substrate suspended in a saturated aqueous solution of the coating material. These stabilizers remain flowable even when subjected to temperatures as high as sterilization temperatures.

BRIEF DESCRIPTION OF THE DRAWINGS

FIGS. 4 and 5 are graphs showing the effect of the mode by which stabilizer is added to condensed skim milk on protein coagulation.

DETAILED DESCRIPTION OF THE PREFERRED EMBODIMENTS

According to the instant invention, sterile viscous dairy products are prepared either by adding the thickening agent in the later stages of sterilization or as a separately presterilized component wherein sedimentation due to protein coagulation is reduced to a commercially acceptable level of between 0.4 ml. and 0.6 ml. and preferably less than 0.5 ml. Sterilization of each component or the blended components can be by any high-temperature, short-time procedure which does not adversely affect the components. One suitable procedure is that disclosed in the Stewart Pat. No. 3,230,095 for use with dairy products to prepare the products for aseptic canning. In such high-temperature, short-time sterilization, high temperatures in the range of 260° F. to 300° F. are used to permit short holding times in the range of one second to five minutes. To achieve high-temperature, short time sterilization, it is customary to heat the dairy product to be sterilized in the form of a fluid by pumping the fluid through a high velocity tubular heater, a steam injection heater, or a steam jacketed tube provided with an agitator for rapid heat transfer. After passage through the heater, the product is normally directed through a holding tube to provide sufficient holding time for sterilization of the fluid. The product is then cooled by passage through a previously sterilized cooler and can be directly filled from the cooler into previously sterilized cans and sealed with previously sterilized lids. Such filling of cans and sealing is accomplished in an atmosphere free of bacteria and is known as aseptic canning.

Figure 1:
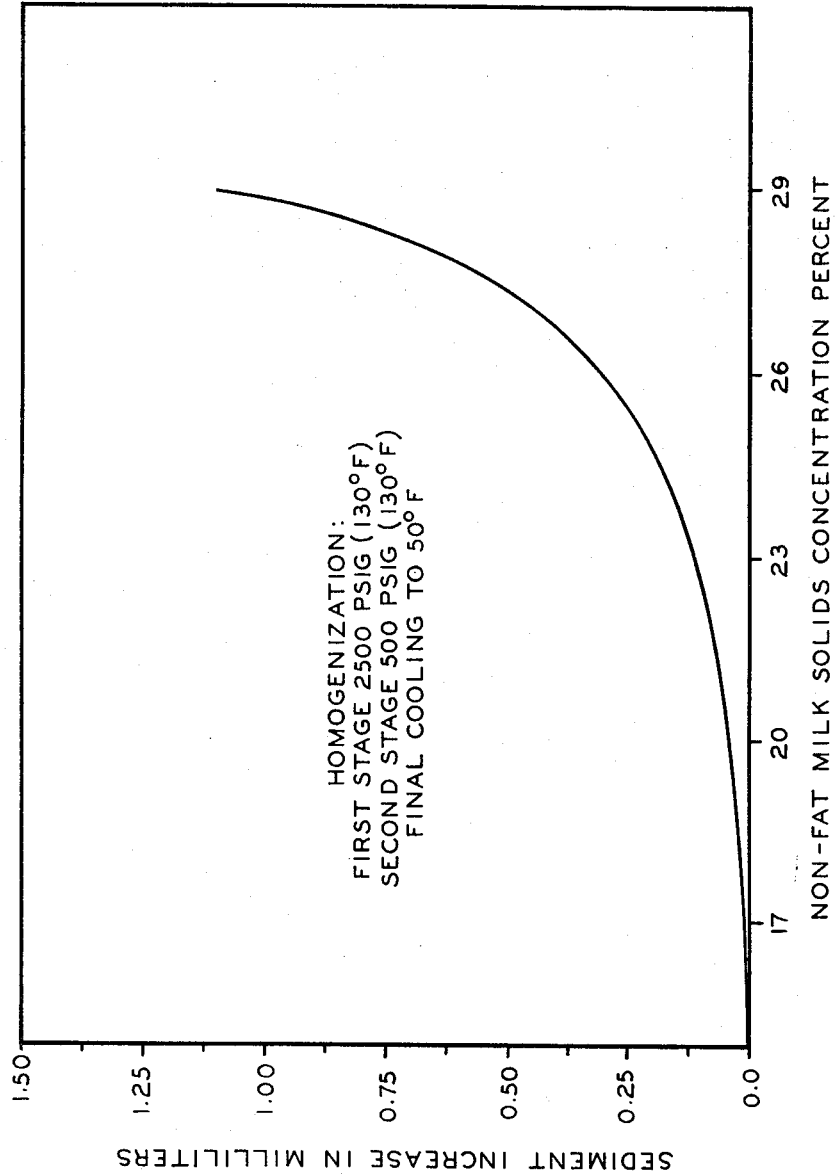
FIG. 1 is graph showing the increase in sedimentation caused by protein coagulation with increasing concentrations of non-fat milk solids. Stabilizer was not added to the samples tested.

FIG. 1 shows the effect of sterilization on protein coagulation in concentrated skim milks having non-fat milk solid concentrations varying between 20–29%. The samples are high-temperature, short-time sterilized with a system similar to that described in aforementioned U.S. Pat. 3,230,095 utilizing the steam injection pump described in U.S. Pat. 3,182,975 to A. P. Stewart, Jr., May 11, 1965. Preheating of the samples to about 130° F. is carried out in tube-and-shell preheating equipment. Steam injection sterilization is carried out at about 272° F. for a holding time of 60 seconds. Following sterilization, the samples are vacuum flash cooled to about 130° F. and the concentrates are homogenized in two stages, the first being at 2500 p.s.i.g. and the second at 500 p.s.i.g. The concentrates are then cooled to 50° F. The resulting products are tested for protein coagulation as follows. Portions of the milk concentrate samples are diluted with water to a solids concentration of 9.0% usually found in regular skim milk and 15 ml. aliquots are placed in graduated conical centrifuge tubes. The aliquot portions are centrifuged for 30 minutes at 2500 r.p.m. in an International Centrifuge Model U.V. of 11 inch diameter. The resulting sediment formation is measured in milliliters as an indication of protein coagulation.

FIG. 1 further illustrates the increase in amount of sediment that occurs as increasingly high non-fat milk solid concentrate solutions are sterilized. Protein coagulation, which causes sedimentation, increases with increasing non-fat milk solid concentrations. Dairy products having in excess of 0.5 ml. of sediment therein are usually regarded as commercially unacceptable due to unsatisfactory flavor and sludging during storage. To obtain test samples wherein sediment formation is below 0.5 ml. it is found necessary to maintain the non-fat milk solid concentration at 27% or below. Satisfactory samples with a solids content in excess of 27% are not possible to obtain, even in the absence of a thickening agent except in certain instances where salt balance is favorably adjusted.

Figure 2:
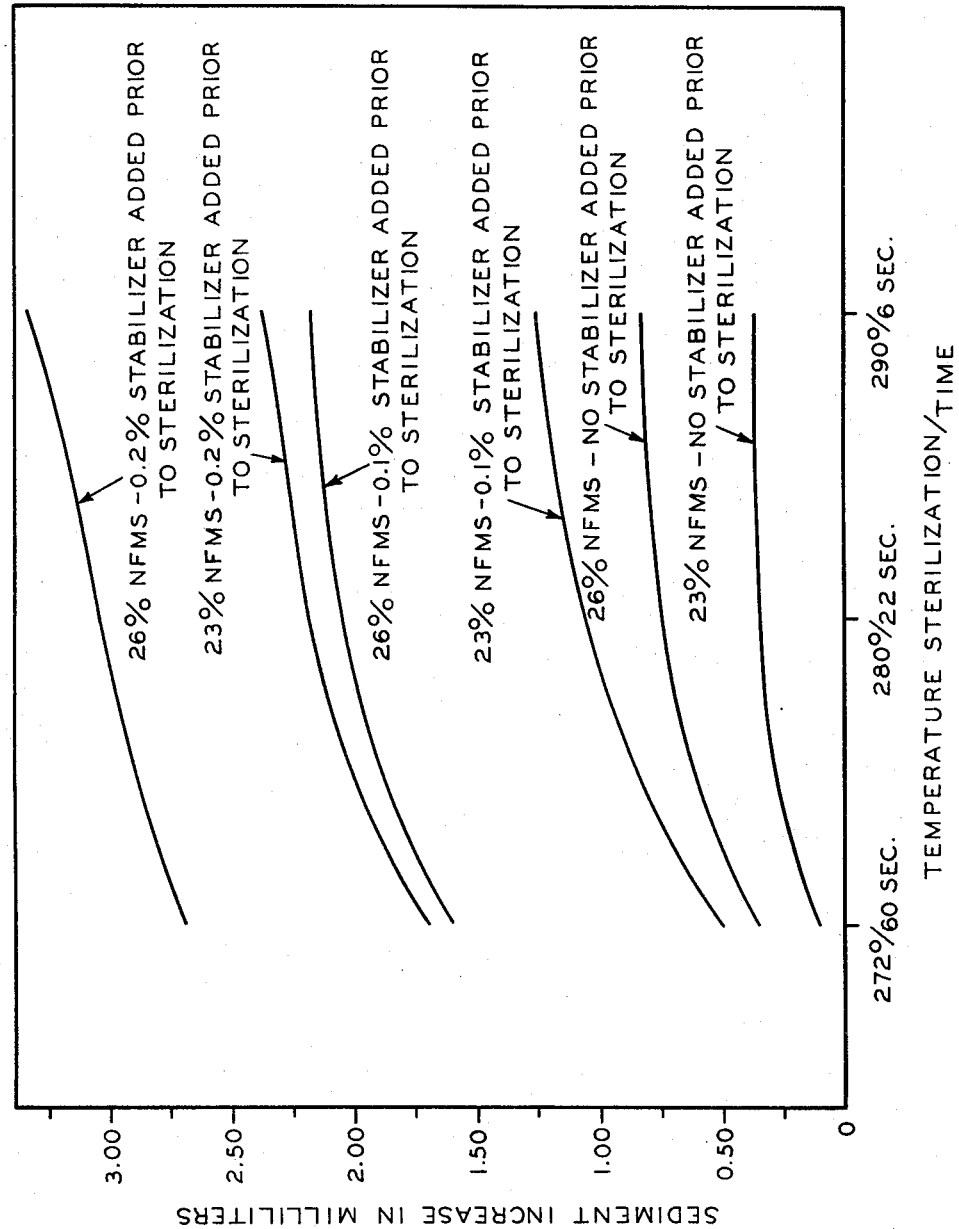
FIG. 2 is a graph showing the coagulative effect of stabilizers on milk protein during high-temperature, short-time sterilization.

FIG. 2 shows that the addition of a thickening agent accelerates sediment formation above acceptable levels when used in a dairy base having a non-fat milk solids content below 27%. Concentrated skim milk samples having non-fat milk solid contents of 23% and 26% are sterilized by preheating to 130° F. and sterilizing at 272° F. for 60 seconds, 280° F. for 22 seconds or 290° F. for 6 seconds. These sterilization times and temperatures all provide equivalent microbiological destruction. To each 23% solids content sample is added 0.1% by weight of sodium alginate thickening agent and to each 26% solids content sample is added 0.2% of sodium alginate thickening agent. In each instance, the thickening agent is admixed with the sample prior to sterilization.

Figure 3:
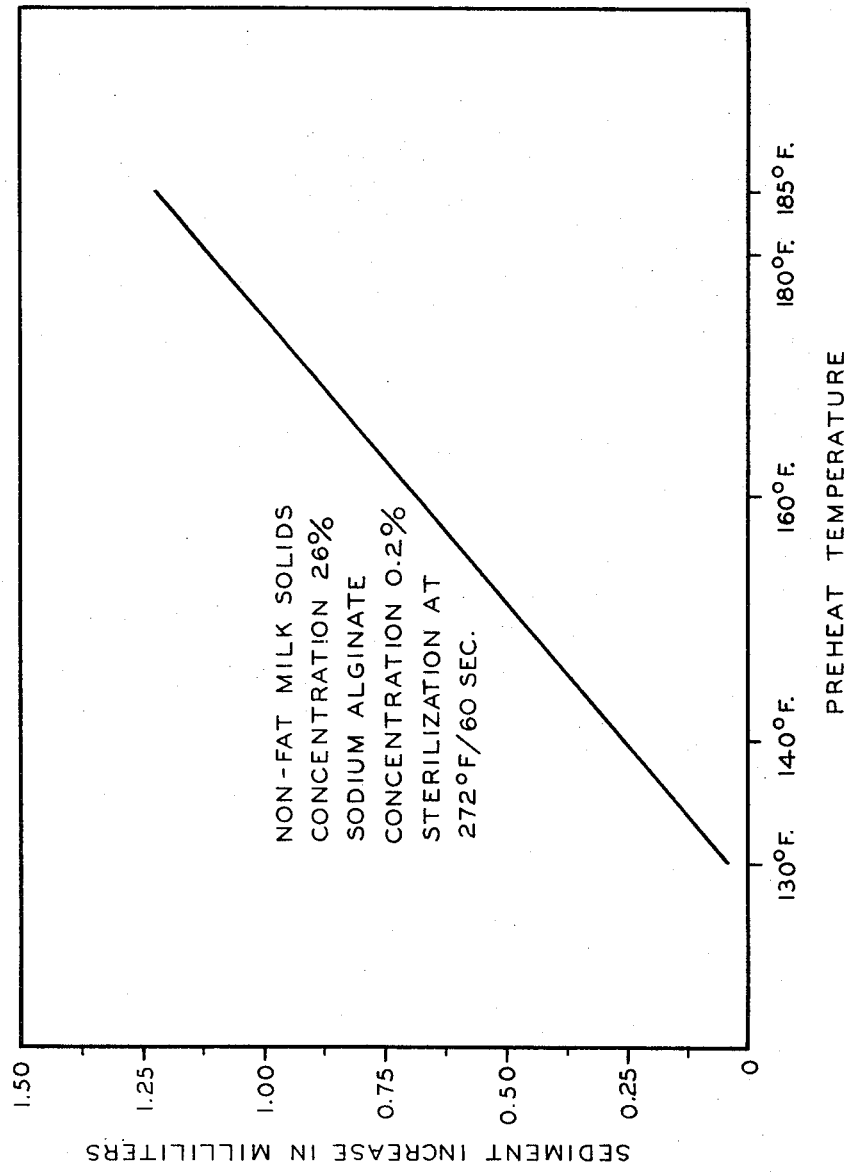
FIG. 3 is a graph showing the effect of preheat temperatures (prior to sterilization) on protein coagulation in concentrated skim milk having a 26% non-fat solids content and containing 0.2% of sodium alginate stabilizer.

FIG. 3 shows the effect of the preheat phase in the sterilization procedure on protein coagulation. According to the chart therein shown, the indirect heating of the preheat phase, substantially below sterilization temperature, causes sedimentation in excess of acceptable levels. To decrease protein destabilization to acceptable levels, dairy base mixes wtih thickeners added are preheated to 130° F. or below prior to sterilization. The graph of FIG. 3 is formulated by preheating, to various temperatures in a tube-in-shell heater, skim milk concentrate samples with 26% non-fat milk solid contents admixed with about 0.2% by weight of sodium alginate, following which the samples are sterilized at 272° F. for 60 seconds.

FIG. 4 shows the superior results obtained by utilizing one embodiment of the instant invention. The graph in FIG. 4 shows the effect, on the sedimentation level, of adding thickening agent concentrations of between 0.1 to 0.3% to condensed skim milk of varying non-fat solids concentrations. The solids content of the skim milk samples vary between 20 and 26%. All the samples are preheated to 130° F. and sterilized by steam injection heating at 272° F. for 60 sec. To three of the dairy base samples in FIG. 4, carboxymethylcellulose thickening agent, abbreviated as CMC, is added by injection after preheat at the intake of the steam injection pump. The thickening agent is sterilized in admixture with the concentrated skim milk at 272° F. for 60 sec. To the other three dairy base samples on the graph, indicated as addition samples, the same amounts of carboxymethylcellulose are added prior to preheat. In all instances where thickening agent is injected into the samples after preheat and at the intake of the steam pump sedimentation is maintained within commercially acceptable levels. The only acceptable viscous dairy base samples having non-fat milk solid concentrations in excess of about 23% and with 0.1% carboxymethylcellulose or higher are prepared by the instant injection method. The only acceptable viscous dairy base sample having 0.3% by weight of thickening agent and solids concentrations of 20% or higher added is prepared by injecting the thickening agent after preheat.

FIG. 5 is illustrative of results obtained in utilizing the preferred embodiment of this invention to prepare sterile viscous dairy products. In FIG. 5 the curve closest to the horizontal axis of the graph therein is illustrative of results obtained by injecting presterilized thickening agent into previously sterilized and cooled dairy product. The curve furthest from the horizontal axis represents the result obtained by admixing the stabilizer initially with the dairy product. In these comparative examples, 0.1% by weight carboxymethylcellulose is added to condensed swim milk having a 26% non-fat solids content, both samples being high-temperature, short-time sterilized at 272° F. for 60 seconds. According to this preferred method, condensed skim milk with viscosities as high as 80 centipoises at 72° F. can be prepared while maintaining the sedimentation level below the acceptable level of 0.5 ml.

It is found that the addition of sufficient stabilizer to raise the viscosity of the condensed skim milk to 50 cps.

at 72° F. or above causes some protein coagulation if added before preheating and sterilization.

As shown by the graphs herein discussed, even mild high-temperature, short-time sterilization conditions and mild indirect preheating conditions of 130° F. or below, prior to steam injection sterilization, cause excessive protein coagulation at non-fat milk solid levels greater than 27%. However, we have found that some types of condensed skim milk adjusted in salt balance, through the addition of sodium citrate or disodium phosphate, are sterilizable at solid concentrations as high as 29–31% and wherein protein coagulation is maintained below acceptable levels.

When stabilizer is added to condensed skim milk at the inlet or outlet of the steam injection heater and sterilization of the stabilizer is accomplished during the holding period, dairy products having non-fat milk solid concentrations as high as 26% can be prepared while maintaining sedimentation within acceptable levels. This method is desirable when sterilization is carried out at about 272° F. for about 60 sec. and dairy products with viscosities in excess of 50 cps. are desired. If higher sterilization temperatures are used for shorter holding periods, e.g. 280° F. for 22 seconds, 290° F. for 6 seconds, the non-fat milk solids in the dairy base should be reduced by 1% to obtain the most desirable results as compared with dairy bases sterilized at 272° F. for 60 sec.

By injecting solutions of previously sterilized thickening agents into previously sterilized and cooled concentrated skim milk, viscosities as high as 100 cps. can be developed without substantial protein coagulation induced by the thickening agent addition. In very viscous products containing non-fat milk solids, such as pie fillings, the thickening agent is preferably added after sterilization and cooling.

The following examples as illustrative of the data used in preparing the graphs in FIGS. 1 to 5. All percentages in the examples below are by weight unless otherwise specified.

Example 1

A milk shake mix concentrate was prepared by admixing 5.79% fat, 17.75% non-fat milk solids by weight on the total formulation, 16.0% sugar, 0.19% of carboxymethylcellulose, 59.8% water, .06% salt, 0.16% sodium citrate and 0.19% vanilla. The admixture was high-temperature, short-time sterilized by preheating to 130° F. in a tube-in-shell heater, steam injection sterilized at 272° F. for 60 sec., cooled to 130° F., homogenized at 2500 p.s.i.g. in a first stage, homogenized at 500 p.s.i.g. in a second stage, finally cooled to 50° F and aseptically canned. The non-fat milk solids content of the mix was 22.8% in the water phase. Aliquot samples were placed in graduated conical centrifuge tubes and centrifuged for 30 minutes at 2500 r.p.m. in an International Centrifuge Model U.V. of 11 inch diameter. The resulting sediment was measured in milliliters as an indication of the degree of protein coagulation. The sedimentation level was measured as 1.6 ml. The sedimentation level of an aliquot sample of the unsterilized mix was measured as 0.05 ml.

Example 2

A milk shake mix concentrate was prepared by admixing 5.79% fat, 17.9% non-fat milk solids, by weight on the total formulation, 14.58% sugar, 0.16% sodium citrate, 0.06% salt and water. The viscosity of the admixture was 12 cps. No thickening agent was added. The admixture was high-temperature, short-time sterilized as in Example 1 and a presterilized aqueous solution of thickening agent was injected into the admixture in measured amounts to form a final composition that was the same as in the previous example. The stabilizer was injected at a point just prior to first stage homogenization. An aliquot portion, as in Example 1, was removed and centrifuged. The sedimentation level was measured as 0.07 ml. and the viscosity of the resulting mix was 28 cps. at 70° F.

Example 3

A milk shake mix concentrate was prepared by admixing 5.79% fat, 17.9% non-fat milk solids by weight on the total formulation, 13.5% sugar, 0.16% sodium citrate, .09% vanilla, 0.06% salt, and water. The viscosity of the admixture was measured as 70 centipoises at 62° F. after preheating to 130° F. 0.23% of carboxymethylcellulose was injected into the admixture at the intake of the steam injector. The viscosity of the mix was 58 cps. measured at 80° F. after second stage homogenization. The sediment level of the resulting milk shake mix remained below 0.5 ml.

In the following examples, all parts are by weight.

Example 4

A pie filling was prepared by admixing 1491 parts of condensed skim milk, 376 parts of sugar syrup, 105 parts of starch, 6 parts of salt, 14 parts of egg yolk and 1 part of sodium citrate. The admixture was preheated to 145° F. in a tube-and-shell preheater and sterilized by means of a steam injection system at 282° F. with a holding time of 60 sec. The product was then passed through a vacuum chamber which cooled the product to 220° F. At this point a sterile solution of calcium sensitive thickening agent was injected into the admixture. The solution was composed of 8 parts of an agglomerated form of low-viscosity sodium alginate, marketed by the Kelco Company under the trademark Kelflo, 160 parts of water and 20 parts of vanilla extract. Flow rates were regulated such that the 188 parts of injection mixture was uniformly distributed through the 1993 parts of base product during the processing period.

The injection mixture was sterilized at 275° F. for 60 sec. by means of a scraped surface type of heat exchanger. After injection, the product was homogenized at 200 p.s.i.g. and finally cooled to 95° F. in a tube-and-shell heat exchanger. The final product has a viscosity measured after 48 hrs. at 72° F. of 85,000 cps. and a very smooth texture, giving no indication of protein coagulation.

When the calcium sensitive thickening agent solution was added directly to the base product tank, initially, the admixture became too thick to pump out of the vacuum chamber following sterilization. Examination of a portion of this control sample in the vacuum chamber revealed evidence of protein coagulation in the form of a very grainy texture.

Having described this invention and discussed several embodiments and exemplifications thereof, it is not intended that this invention be limited by any of the details of description unless otherwise specified, but rather be construed broadly within its spirit and scope as set out in the accompanying claims.

What is claimed is:
1. In a process for preparing a sterile viscous dairy product selected from the group consisting of pie fillings, puddings, ice cream mix concentrates and milk shake concentrates, by high-temperature, short-time sterilization procedures wherein an edible stabilizer selected from the group consisting of vegetable gums, synthetic gums, seaweed extracts, starches and pectins which promotes thickening and causes protein coagulation is admixed with an aqueous protein-containing dairy base containing milk solids, the improvement which comprises:
 (a) providing a dairy base having a non-fat milk solids content in excess of 20% by weight,
 (b) steam injection sterilizing said dairy base at temperatures within the range of 260° F. to 300° F. for a time within the range of one second to five minutes,
 (c) flash cooling said sterile dairy base to about 130° F. to 220° F.,

(d) separately sterilizing said stabilizer at temperatures within the range of 260° F. to 300° F. for a time within the range of one second to five minutes, and (e) admixing said sterile stabilizer with said cool dairy base to form a homogeneous blend, said blend having a protein sedimentation level below 0.5 ml., and (f) preparing said dairy product from the homogeneous blend.

2. The process described in claim 1 wherein said sterile stabilizer is cooled to between 130° F. and 220° F. prior to admixture with said cool dairy base.

3. The process described in claim 2 wherein said sterile blend is homogenized, cooled and canned under sterile conditions.

4. The process described in claim 3 wherein homogenization is carried out in two stages.

5. In a process for preparing sterile viscous dairy products wherein an edible stabilizer selected from the group consisting of vegetable gums, synthetic groups, seaweed extracts, starches and pectins which promotes thickening and causes protein coagulation is admixed with an aqueous protein-containing dairy base containing milk solids and wherein sterilization is carried out under high-temperature, short-time conditions by preheating said base and steam injection sterilizing said base at temperatures within the range of 260° F. to 300° F. for a holding time within one second to five minutes, the improvement which comprises: dispersing said stabilizer in said base by injection after preheat and at the intake of said steam injector, thereby forming a sterile homogeneous blend.

6. The process described in claim 5 wherein said sterile blend is cooled, homogenized, finally cooled and canned under sterile conditions.

References Cited

UNITED STATES PATENTS

| | | | |
|---|---|---|---|
| 2,170,196 | 8/1939 | Grindrod | 99—212 X |
| 2,924,531 | 2/1960 | Stewart et al. | 99—212 |
| 3,052,555 | 9/1962 | Stewart et al. | 99—183 |
| 3,072,491 | 1/1963 | Leviton et al. | 99—212 |
| 3,340,072 | 9/1967 | Stewart et al. | 99—212 |
| 3,385,714 | 5/1968 | Smith | 99—171 |
| 3,539,363 | 11/1970 | Morgan et al. | 99—212 |

NORMAN YUDKOFF, Primary Examiner

K. VAN WYCK, Assistant Examiner

U.S. Cl. X.R.

99—54, 136, 139